US009011706B2

(12) United States Patent
Li et al.

(10) Patent No.: US 9,011,706 B2
(45) Date of Patent: Apr. 21, 2015

(54) METHOD OF MAKING FORAMINOUS MICROSTRUCTURES

(75) Inventors: Yang Yang Li, Hong Kong (CN); Zhengtao Xu, Hong Kong (CN); Chun Kwan Tsang, Hong Kong (CN)

(73) Assignee: City University of Hong Kong, Kowloon Tong, Kowloon (HK)

( * ) Notice: Subject to any disclaimer, the term of this patent is extended or adjusted under 35 U.S.C. 154(b) by 261 days.

(21) Appl. No.: 12/335,876

(22) Filed: Dec. 16, 2008

(65) Prior Publication Data

US 2010/0147800 A1      Jun. 17, 2010

(51) Int. Cl.
| | | |
|---|---|---|
| *B31D 3/00* | (2006.01) | |
| *C23F 1/00* | (2006.01) | |
| *C25D 5/18* | (2006.01) | |
| *B82Y 20/00* | (2011.01) | |

(52) U.S. Cl.
CPC ..................... *B82Y 20/00* (2013.01)

(58) Field of Classification Search
USPC .......................................................... 216/56
See application file for complete search history.

(56) References Cited

U.S. PATENT DOCUMENTS

| | | | | |
|---|---|---|---|---|
| 3,716,464 | A * | 2/1973 | Kovac et al. ................. | 205/259 |
| 4,511,438 | A * | 4/1985 | DiStefano et al. ............ | 428/586 |
| 4,835,584 | A * | 5/1989 | Lancaster ..................... | 257/330 |
| 6,132,584 | A * | 10/2000 | Hubel .......................... | 205/103 |
| 6,653,701 | B1 * | 11/2003 | Yamazaki et al. ............ | 257/414 |
| 7,294,409 | B2 * | 11/2007 | Lye et al. ..................... | 428/610 |
| 7,425,255 | B2 * | 9/2008 | Detor et al. ..................... | 205/81 |
| 2003/0116790 | A1 * | 6/2003 | Kikuchi et al. ............... | 257/208 |
| 2005/0186250 | A1 * | 8/2005 | Gertner et al. ................ | 424/423 |
| 2006/0211802 | A1 * | 9/2006 | Asgari ......................... | 524/439 |
| 2006/0254924 | A1 * | 11/2006 | Ichihara et al. ............... | 205/255 |
| 2009/0057159 | A1 * | 3/2009 | Detor et al. ................... | 205/238 |
| 2010/0282613 | A1 * | 11/2010 | Schuh et al. ................. | 205/170 |

OTHER PUBLICATIONS

D. Tench, J. White; "Enhanced Tensile Strength for Electrodeposited Nickel-Copper Multilayer Composites," *Metallurgical Transactions*, 15A, pp. 2039-2040, (Nov. 1984).
U. Cohen et al.; "Electroplating of Cyclic Multilayered Alloy (CMA) Coatings," *J. Electrochem. Soc.*, vol. 130, No. 10, pp. 1987-1994, (Oct. 1983).
Yu D. Gamburg; "Electrodeposition of Alloys with Composition Modulated over Their Thickness: A Review," *Russian J. of Electrochemistry*, vol. 37, No. 6, pp. 585-590, (2001).
J. Switzer et al.; "Electrodeposited Ceramic Superlattices," *Science*, vol. 247, pp. 444-446, (Feb. 1990).
J. Erlebacher et al.; "Evolution of nanoporosity in dealloying," *Nature*, vol. 410, pp. 450-453. (Mar. 22, 2001).
Li Sun et al.; "Fabrication of Nanoporous Nickel by Electrochemical Dealloying," *Chem. Mater.*, vol. 16, No. 16, pp. 3125-3129, (2004).

(Continued)

*Primary Examiner* — Binh X Tran
*Assistant Examiner* — Thomas Pham
(74) *Attorney, Agent, or Firm* — Leydig, Voit & Mayer, Ltd.

(57) ABSTRACT

A foraminous microstructure or film that has photonic or plasmonic properties is made by forming a structure or film composed of at least two constituent materials so that the compositional ratio of the constituent materials varies in a depth direction of the structure, and then removing one of the materials from the structure.

16 Claims, 7 Drawing Sheets

(56) References Cited

OTHER PUBLICATIONS

N A Senior, R C Newman; "Synthesis of tough nanoporous metals by controlled electrolytic dealloying," *Nanotechnology*, 17, pp. 2311-2316, (2006).

W. L. Barnes et al.; "Surface plasmon subwavelength optics," *Nature*, vol. 424, pp. 824-830, (Aug. 14, 2003).

D. Schurig et al.; "Metamaterial Electromagnetic Cloak at Microwave Frequencies," *Science*, vol. 314, pp. 977-980, (Nov. 10, 2006).

L. Martinu, D. Poitras, "Plasma deposition of optical films and coatings: A review," *J. vac. Sci. Technol.*, A 18(6), pp. 2619-2645, (Nov./Dec. 2000).

W. Heiss et al.; "Epitaxial Bragg mirrors for the mid-infrared and their applications," *Progress in Quantum Electronics*, 25, pp. 193-228, (2001).

A. C Van Popta et al.; "Gradient-index narrow-bandpass filter fabricated with glancing-angle deposition," *Optics Letters*, vol. 29, No. 21, pp. 2545-2547, (Nov. 1, 2004).

J. R. Dorvee et al.; "Manipulation of liquid droplets using amphiphilic, magnetic one-dimensional photonic crystal chaperones," *Nat. Mater.*, vol. 3, pp. 896-899, (Dec. 2004).

J. G. Fleming et al.; "All-metallic three-dimensional photonic crystals with a large infrared bandgap," *Nature*, vol. 417, pp. 52-55, (May 2002).

X. Zhang et al.; "Layer-by-layer assembly: from conventional to unconventional methods," *Chem. Commun.*, 14, pp. 1395-1405, (2007).

R. Almeida, S. Portal; "Photonic band gap structures by sol-gel processing," *Current Opinion in Solid State and Materials Science*, 7, pp. 151-157, (2003).

A. C. Edrington et al.; "Polymer-Based Photonic Crystals," *Adv. Mater.*, vol. 13, No. 6, pp. 421-425, (Mar. 16, 2001).

A. Hynninen et al.; "Self-assembly route for photonic crystals with a bandgap in the visible region," *Nature*, vol. 6, pp. 202-205, (Mar. 2007).

R. F. Ziolo et al.; "Matrix-Mediated Synthesis of Nanocrystalline $\gamma$-$Fe_2O_3$: A New Optically Transparent Magnetic Material," *Science*, vo. 257, pp. 219-223. (Jul. 10, 1992).

M. Gich et al.; "High-coercivity ultralight transparent magnets," *Appl. Phys. Lett.*, vol. 82, No. 24, pp. 4307-4309, (Jun. 16, 2003).

R. B. Bergmann; "Crystalline Si thin-film solar cells: a review," *Appl. Phys.*, A 69, pp. 187-194, (1999).

A. V. Shah et al.; "Material and solar cell research in microcrystalline silicon," *Solar Energy Materials & Solar Cells*, 78, pp. 469-491, (2003).

M. J. Sailor, J. R. Link; "'Smart dust': nanostructured devices in a grain of sand," *Chem. Commun.*, pp. 1375-1383, (2005).

D. P. O'Neal et al.; "Photo-thermal tumor ablation in mice using near infrared-absorbing nanoparticles," *Cancer Letters*, pp. 171-176, (2004).

Y. Li et al.; "Polymer Replicas of Photonic Porous Silicon for Sensing and Drug Delivery Applications," *Science*, vol. 299, pp. 2045-2047, (Mar. 28, 2003).

E. F. Schubert, J. K. Kim; "Solid-State Light Sources Getting Smart," *Science*, vol. 308, pp. 1274-1278, (May 27, 2005).

E. Ozbay; "Plasmonics: Merging Photonics and Electronics at Nanoscale Dimensions," *Science*, vol. 311, pp. 189-193, (Jan. 13, 2006).

T. Minami et al.; "Transparent conducting zinc-co-doped ITO films prepared by magnetron sputtering," *Thin Solid Films*, 373, pp. 189-194, (2000).

\* cited by examiner

METHOD OF MAKING FORAMINOUS MICROSTRUCTURES

BACKGROUND OF THE INVENTION

1. Field of the Invention

The current invention relates to methods of making foraminous, or porous, microstructures, and in particular to methods of making foraminous films for use in photonic or plasmonic applications.

2. Background Information

The current major challenge in the fabrication of photonic structures is in creating structures with sufficient precision and good scalability. Hitherto man-made photonic structures have been fabricated by one of two commercial techniques. The first technique is based on a family of vapor deposition techniques for constructing photonic coatings on mirrors and lens. These vapor deposition methods usually entail sophisticated and expensive vacuum equipment and control systems. The other technique is the fiber draw technique. This technique does not entail vapor deposition processes, but is exclusively limited to the fabrication of photonic crystal fibers.

Other non commercial methods for photonic structures are available. One widely used approach is based on sophisticated micro-fabrication methods derived from microelectronics and laser beam writing techniques; however, these methods are usually either labor-intensive, expensive or complex and are not commercially used. Other common methods under development include electrochemical etching, layer-by-layer assembly, sol-gel deposition, block copolymer phase separation and colloidal self-assembly. However, electrochemical etching method only applies to single crystal semiconductor wafers, and the other methods are inconvenient to achieve for instance continuously modulating photonic structures with high resolution. The colloidal self-assembly involves using self-assembled colloidal nanobeads as templates, however, this approach is subject to the structural defects inherent in the template, and lacks flexibility in designing structural features other than those molded by the closest packed nanobeads.

SUMMARY OF THE INVENTION

The current invention provides a method of making a foraminous microstructure or film that can be made to exhibit photonic and plasmonic properties using well-established solution-based deposition and post-deposition modification techniques, without sophisticated and expensive vacuum equipment or control systems. More specifically, the invention provides for a method of making a foraminous microstructure, comprising forming a structure comprising at least two materials wherein a ratio between the two materials varies in a depth direction of the structure, and removing one of the materials from the structure.

The structure can be formed in a generally flat (although the formed structure can have non-flat surface features) film or sheet by electrodeposition in a solution containing salts of at least the two materials using a waveform signal that varies with time. Variation of the waveform varies the ratio of the two materials being deposited. As the waveform signal varies with time the ratio between the two materials varies in a depth direction of the film or sheet structure. Preferably, although not exclusively the waveform signal is varied periodically, such as sinusiodally, to achieve a periodically varying ratio of the two materials through the depth of the structure. Using this technique the ratio of the two materials can, for example, be made to vary sinusiodally through the depth of the structure.

Removing one of the materials from the multi-component structure can be achieved by chemically dissolving the material using a selective etching or dealloying process. Removing one of the materials leaves foramen, or pores, in the remaining material that makes up the structure. The foraminosity of the structure varies through the depth of the structure in direct relation to the ratio of the two materials through the depth of the structure.

After one of the material is removed the structure can, optionally, be treated to change the chemical composition, chemistry or structural features of the structure. This can be done by, for instance, heating to generate oxidation of the surfaces in the foraminous structure or through chemical treatment.

The method of the invention can be used to achieve elaborate periodic microstructures with high structural precision and uniformity over a large area substrate (e.g., on centimeter scale or larger). The overall procedure is highly efficient and amenable to automatic fabrication for mass production. The method of the invention does not require flat substrate surface, but allows for the structure to be deposited on substrates with diverse geometrical features. The compositional profile of the structure deposition can be flexibly controlled and varied to achieve a specialized function such as color coded conductor/magnet, anti-reflection conductor/magnet, transparent conductor/magnet, and photovoltaic electrode materials with high-absorption at the entire solar wavelengths.

Further aspects of the invention will become apparent from the following description, which is given by way of example only.

BRIEF DESCRIPTION OF THE DRAWINGS

The embodiments of the invention will now be described by a way of example and with reference to the following figures.

DETAILED DESCRIPTION OF THE INVENTION

The flowing description is given by way of example only to illustrate the invention and is not intended to limit the scope of use or functionality of the invention. The invention is illustrated as practiced in making a photonic film, however, those skilled in the art will understand that a foraminous structure made according to the invention may have a variety of uses, examples of which are given later in the description.

Figure 1:
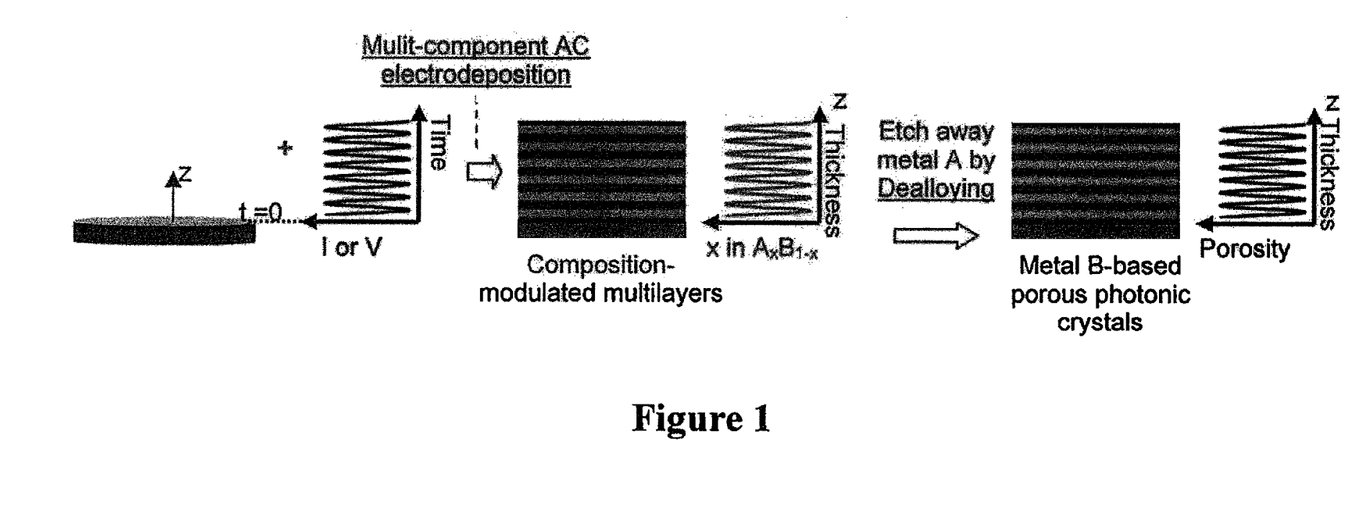
FIG. 1 is a schematic illustration of a method of making a foraminous structure according to the invention.
Figure 2:
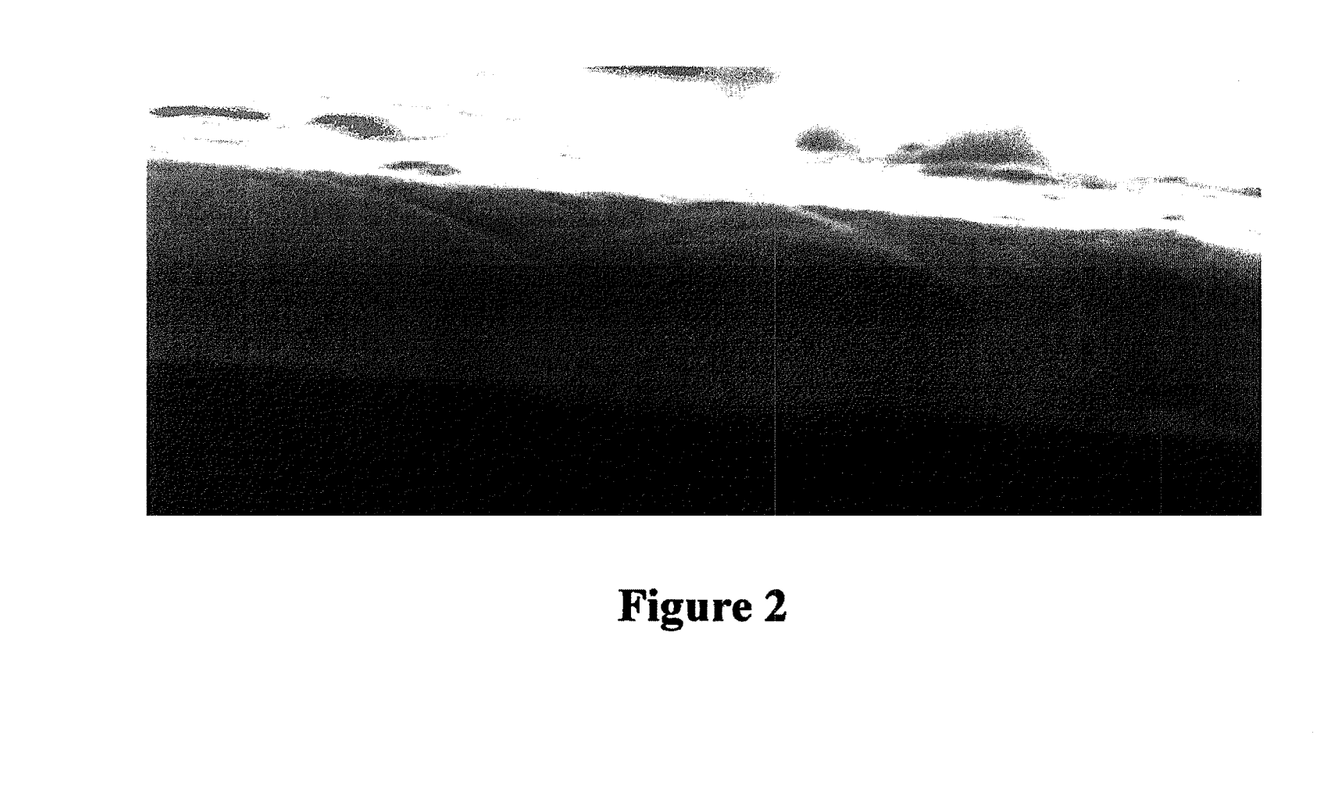
FIG. 2 scanning electron microscopy image showing the side of the electrodeposited structure prior to dealloying.

Referring to FIG. 1, a method of making a photonic film using the invention comprises firstly forming a thin film like structure consisting of two component materials 1, 2 on a substrate 3 using a deposition process. The preferred embodiment uses electrodeposition, although vapor deposition may also be used. The electrodeposition waveform is varied periodically, for example in a square wave or sinusoidally, to create a periodic variation in the ratio of the component materials 1, 2 through the depth of the structure. This periodic variation in the ratio of the component materials through the depth of the structure creates a layering effect where each layer has a different ratio between the two materials 1, 2 making up the structure. One of the deposited component materials 1 is then removed by chemically dissolving by an etching or dealloying process to create pores or foramen in the structure with the desired periodic foraminosity/porosity profile along the film depth, hence giving the film structure photonic properties.

Although not critical to the invention, the etched structure can also be subjected to a surface treatment step, for example thermal treatment or chemical modification, in order to modify the surface further. The parameters of electrodeposition, selective etching, and post-treatment can all be adjusted to fine-tune the structures and chemistry of the foraminous structure, and thus optimize the desired photonic response, for example the compositional profile along the film depth can be precisely controlled during electrodeposition using a carefully designed waveform profile.

Electrodeposition of binary multilayered films is a well known technique that is over two decades old. The fabrication of binary multilayer structures by electrodeposition is a well known technique and within the capability of the skilled addressee. In the preferred embodiment of the invention a single bath containing a mixture of the salts corresponding to the target structure component materials is used. A substrate is placed in the bath and a varying AC waveform signal applied to precisely control the composition ratio of the structure as it is grown on the substrate. For example, to achieve a square wave compositional profile for a Copper Nickel (Cu—Ni) multilayer structure electrodeposition is carried out in a single bath contain a mixture of metal salts of both Copper and Nickel. Alternate voltage square wave cycles including a $Ni0.4\ Cu0.6$ deposition cycle at a first specific voltage and a $Ni0.7\ Cu0.3$ deposition cycle at second specific voltage is used to vary the composition ratio of Copper and Nickel as the structure is built up on the substrate. The amount of charge passed during each deposition cycle is controlled to control the thickness or depth of each compositional layer within the structure. After electrodeposition to create the foraminous multilayer structure, for example the foraminous Cu—Ni multilayer structure, selective etching in the following process can then conveniently remove for instance Cu and leave a foraminous Ni structure with a square wave foraminosity profile.

Dealloying is well known for making nano-foraminous metals from homogeneous alloys, however, it has not previously been used in etching multilayer structures. To facilitate dealloying, and thus to generate the periodic modulating foraminosity profile along the film thickness, we introduce into each lamellar domain both components and create a more gradual compositional variation along the film thickness direction. Selective etching is then applied to transform such a deposition into foraminous structures.

By applying a carefully designed voltage/current profile, the procedure described here allows for the electrodeposition of compositional modulated multilayered structures comprised of two or more components. Binary multilayer structures fabricated by electrodeposition have been extensively studied for their interesting magnetic and mechanical properties for over two decades but have been limited to systems of densely packed, alternating single-component layers, and no effort to selectively remove one component from these multilayered systems (e.g., by selective etching) has been reported in scientific or commercial literature. This is probably because the multilayered configuration, being parallel to the substrate surface, would likely collapse after the removal of one particular type of layer, or it would prevent the selective etching from crossing the different layers in the first place. The periodic interface between metals and dielectrics, which is crucial for the occurrence of photonic behavior is thus absent in these traditional multilayers.

The method described above can also be used to make dielectric photonic microstructures or films. This is done by converting the electrodeposited, selectively etched conducting materials to dielectric materials by a further treatment, such as thermal treatment in oxygen, nitrogen or other atmosphere, or chemical treatment. More complicated photonic materials can be obtained by combining this invention with patterning techniques, e.g., soft lithography. 2-D and 3-D photonic materials can thus be fabricated.

It is also possible to make dielectric photonic materials by converting the electrodeposited materials to dielectric materials directly, by the templating approach. Using the porous materials fabricated as templates, photonic composites can be fabricated by infusing such templates with foreign species such as a polymer solution. If the template is chosen to be removed afterwards, photonic imprints comprised of a polymer matrix can be obtained.

The invention provides an economical and versatile fabrication method for photonic structures. It enables the manufacture of a wide range of photonic materials that are not conveniently accessible by the current methods and thus offers a new platform for various applications.

This invention is naturally-suited for constructing plasmonic materials, one type of photonic materials which exhibits extraordinary ability to control and modulate light using metal-dielectric interface features. The potential applications provided by these plasmonic materials are wide-ranging and of far-reaching importance. For example, they can be employed to make transparent conductors/magnets, all-absorption photovoltaic electrode materials for solar cell applications, higher-resolution microscopes and better detectors, more efficient light-emitting devices, to selectively demolish cancer cells, to revolutionize computing by replacing the purely electronic circuits, and even to make objects invisible. The invention provides an efficient solution to the current fabrication challenge of miniscule features with sufficient precision and good scalability in order to generate useful plasmonic properties; and thus enable various applications including those that have been remained largely theoretical curiosities.

This invention also provides an efficient method for constructing other photonic structures besides plasmonic ones. It eliminates the need for complicated and expensive instruments for constructing elaborate photonic structures, such as rugate filters, microcavities and anti-reflection films. These fabricated photonic structures can be applied for instance as catalysts, chemical and biological sensors, biomedical devices and templating materials.

In the preferred embodiment the structure is formed by electrodeposition. However, the multi-component structure can also be fabricated by vapor deposition of at least two materials whose compositional ratio is controlled along the film growth direction. Even though vapor deposition usually entails vacuum, high temperature, and complex apparatus and does not offer as much convenience in achieving the complex compositional profile as electrodeposition does (e.g., the sinusoidal compositional variation would pose a significant challenge in the common vapor deposition procedure), it is a well-established technique for fabricating multi-component films whose composition can be varied precisely along the film growth direction following a pre-determined profile. Thus, vapor deposition can be used as a complimentary method of the above-mentioned electrodeposition method, particularly when the desired multi-component materials cannot be electrodeposited easily or cannot be electrodeposited at all.

In the above described example the structure is formed by electrodeposition using a periodic waveform in order to periodically vary the ratio of the constituent materials through the structure. The variation can be a smooth sinusoidal change with the ratio of materials varying gradually from say prominently one material to an even ratio to predominantly the other material and gradually back to prominently the first material and so on. However, periodic changes in the ratio of the two materials are preferred not essential to the invention. The ratio of constituent materials need not be periodic and can vary in any linear or non-linear fashion. For example, the ratio of constituent materials may vary gradually in a linear or exponential manner from prominently one material to predominantly the other material through the depth of the structure.

Other advantages of the invention are:—

1. Simple experimental setup without expensive equipment such as vacuum, clean room, or sophisticated control systems which are generally required of the current technologies for fabricating photonic/plasmonic structure, e.g. the vapor deposition techniques and other expensive and complicated micro-fabrication methods micro-fabrication methods derived from microelectronics and laser beam writing techniques.

2. Solution-processing for convenient large-area deposition with high uniformity that can be readily mass produced on an industrial scale.

3. Tailor-made, elaborate periodic structural profiles can be accurately targeted and achieved with high structural precision. The resonance features of the photonic product can be easily adjusted by modifying the experimental parameters of the deposition and post-deposition modification processes. The compositional profile of the multi-layer deposition can be flexibly controlled and varied to achieve a specialized function such as anti-reflection conductor/magnet, transparent conductor/magnet, and photovoltaic electrode materials with all-absorption at solar wavelengths.

4. Current technologies are not suited for conveniently creating well-defined modulated porosity profiles. By comparison, the selective etching step in this approach naturally creates excellent porosity. Moreover, the modulating features of the porosity is conveniently defined and controlled in the deposition step. Extensive porosity allows for surface modifications to modify the dielectric contrast to further regulate the photonic/plasmonic behavior; enables sensing, catalysis, separation; allows for applications related to SERS, MALDI techniques. Porosity also allows for fabrication of advanced nanocomposites (e.g., drug release systems) by filling the pores with various functional components. Porous materials can also act as the template for producing porous replica systems. Porosity allows for conversion into ceramic metal oxides with properties such as semiconductivity for advanced applications such as photovoltaics. Schottky metal-semiconductor interface can be conveniently generated for solar cell applications.

5. Compared with the technologies that requires flat substrate surface, this invention allows for photonic films to be deposited on substrates with diverse geometrical features, including cavity interiors, each and every side of a 3D substrate (including rods or spheres or other arbitrary geometries), with substrate dimensions ranging from nanoscales up to macroscales.

6. A wide range of metal and conducting species can be deposited, insofar as the electrochemical potentials of the metal species allow the selective deposition and etching.

7. The simple steps can be readily automated for industry-scale mass production. In a typical run, for example, a one-pot, one-step procedure was used to generate a rugate filter based on metallic components featuring magnetic and well-defined mesoscopic porosity.

Potential uses of the invention include:—

1. All-absorption photovoltaic electrode materials. The fabrication techniques of this invention generate all-absorption photovoltaic electrode materials that are of strong interest to the market of solar cells. Such materials are based on economically viable metal oxide systems that will greatly increase the energy conversion efficiency.

2. Smart paints and coatings. This invention can be readily applied for mass production of smart car coatings or window coatings that can selectively block harmful UV light or reflect the undesired infrared light. It is also possible to instantly adjust the photonic features of these smart coatings by for instance environmental stimuli.

3. Transparent conductors and magnets. This invention will enable transparent conductors and magnets that can be readily mass produced. Such products will prove especially useful for the display industry.

4. Instrumentation. The plasmonic materials made according to the invention provide functional devices to be used for improved fluorescence microscopes, infrared spectroscopy, Raman spectroscopy, mass spectroscopy, and surface plasmon resonance technique.

5. Bio-sensing and high throughput screening. This invention will provide a low cost platform for sensing and screening, whose structural and photonic features can be conveniently designed and fabricated to meet different testing requirements. Moreover these products can be fabricated from magnetic materials for easy collection and manipulation.

6. Biomedical devices. This invention can provide porous microparticles as drug delivery matrices that target cancer cells. Such microparticles can be designed to have a high absorption at the near infrared wavelengths which can penetrate human tissues with low absorption. The microparticles can be equipped with the specific receptors and injected into the human body to target the cancer cells. Using near infrared radiation sources outside the human body, the microparticles can then be selectively heated up and demolish the associated cancer cells. Additionally, self-reporting drug delivery materials or implants can be realized by this invention, as the optical features of these porous photonic materials can be closely coupled with the different stages of drug release. This is done by adjusting the optical features of these devices in the near infrared region and thus by monitoring these optical features one can non-invasively monitor drug releasing or device deformation in real-time.

7. Digital microfluidics. This invention enables magnetic photonic microparticles for transferring microdroplets of load on a substrate without the requirement of patterned channels.

8. Light-emitting devices. This invention provides a type of economical substrate materials to greatly improve the efficiency of light-emitting devices.

9. Optical and electrical circuits. This invention provides an economical substrate material for patterning optical circuits. It is possible for these optical circuits to carry electrical signals as well, due to the conducting properties of the materials.

10. Smart filters, catalysts, and foams. This invention provides the new functions of sensing and coloring to the traditional porous materials that are used as filters, catalysts and foams.

11. Anti-bacteria particles/pollutant degradation. This is made possible by fabricating the photonic structure with a coating of photocatalysing substances (such as $TiO_2$), in which the strongly absorbent photonic materials fabricated by this invention trap and transfer the photonic energy to the photocatalysts.

12. Besides optical-related applications, the invention also provides a group of structures whose well-modulated porous structures can be combined with other properties (e.g., conductivity, magnetism, fluorescence, piezoelectricity and chemical/biological functionalizations) in a wide range of applications including size-selective separation of chemical/biological species (e.g., proteins and viruses), size-selective electrode materials, controlled release drug delivery systems, high-surface-area heterogeneous catalysts, foams (e.g., for noise filtering/blocking), anti-bacterial and anti-fungal materials (e.g., nanostructured silver films).

Example

The invention is further illustrated by the following example. A Ni—Cu system is illustrated because it is among the best established electrodeposited multilayered systems, has interesting magnetic properties and is easily fabricated. A rugate mirror is further chosen to demonstrate the versatility and precision of the invented method, since the continuously modulated composition profile of a rugate filter together with the processing difficulty of metals have posed a great challenge for the current fabrication techniques. To demonstrate the precision of the method, a porous Ni-based multilayer film with each layer of 10 nm thickness is constructed.

Figure 3:
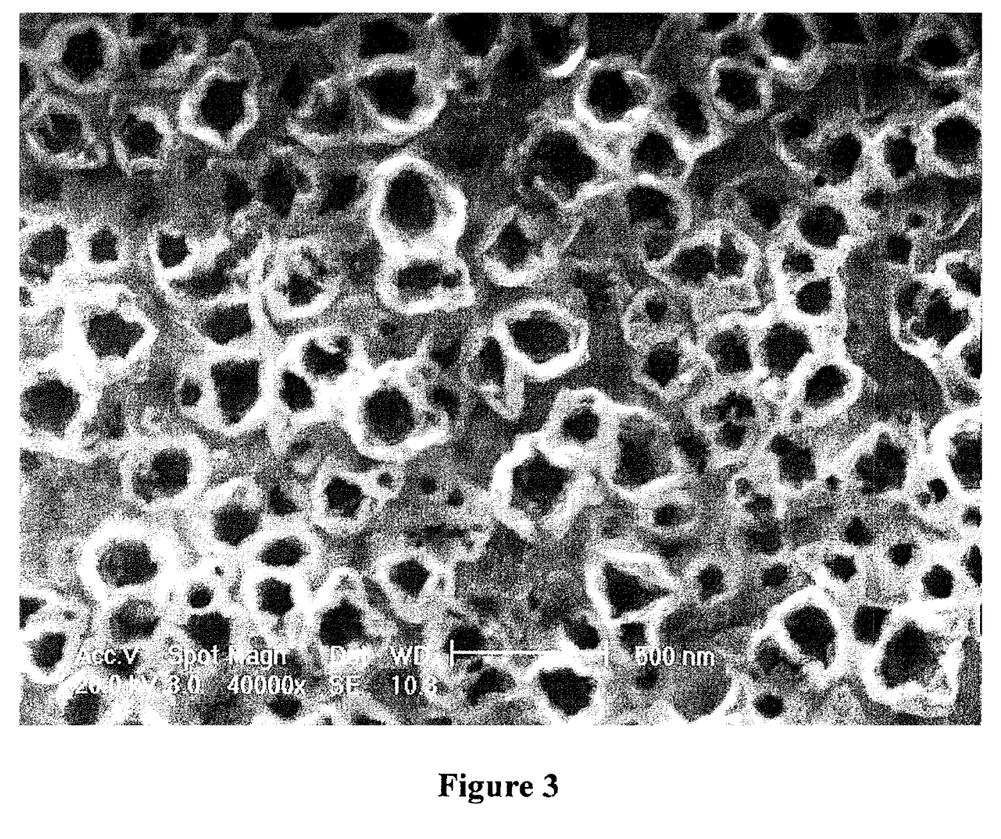
FIG. 3 scanning electron microscopy image showing the top of the Ni-based porous rugate filter structure fabricated by electrodeposition and subsequent dealloying: The foramen, pore, size ranges from 50-200 nm.
Figure 4:
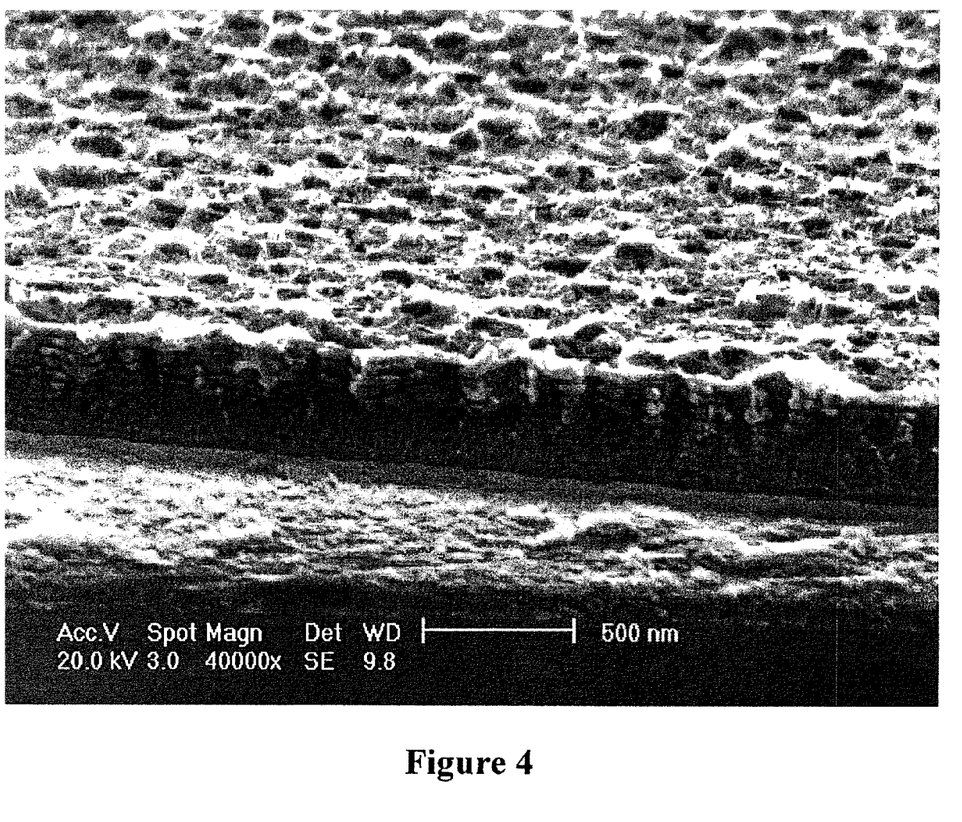
FIG. 4 scanning electron microscopy image showing the side of the Ni-based porous rugate filter structure fabricated by electrodeposition and subsequent dealloying: The periodicity of the layers is about 50 nm along the film thickness, FIG. 5 graphically represents reflectance spectra of the Ni-based porous rugate filter structures fabricated with different structure (layer thickness and the oxide coating thickness).

A Ni—Cu multilayer film is grown by electrodeposition in a deposition solution containing 0.5 M nickel sulfamate (Ni$(H_2NSO_3)_2$) and 0.05 M copper sulfate ($CuSO_4$) buffered to pH 2.5 with boric acid ($H_3BO_3$). A typical three-electrode cell is used, with an ITO glass or Au coated Si wafer as the working electrode, a Pt spiral wires as the counter electrode, and a calomel reference electrode as the reference electrode. A computer controlled potentiostat is used to input a voltage sinewave varying between −0.885 V and −0.850 V with a periodicity of 400 sec between the working electrode and the reference electrode. After the electrodeposition step is completed, Cu is removed by selective dealloying in the same solution at 0.5 V. FIGS. 3 and 4 are scanning electron microscopy images of the structure which respectively reveal that the resulting structure has a foramen, or pore, size ranging from 50-200 nm and a periodicity of about 50 nm along the film thickness from the cross-sectional view. The measured layer thickness agrees well with the monitored charge passed to the system.

Figure 5:
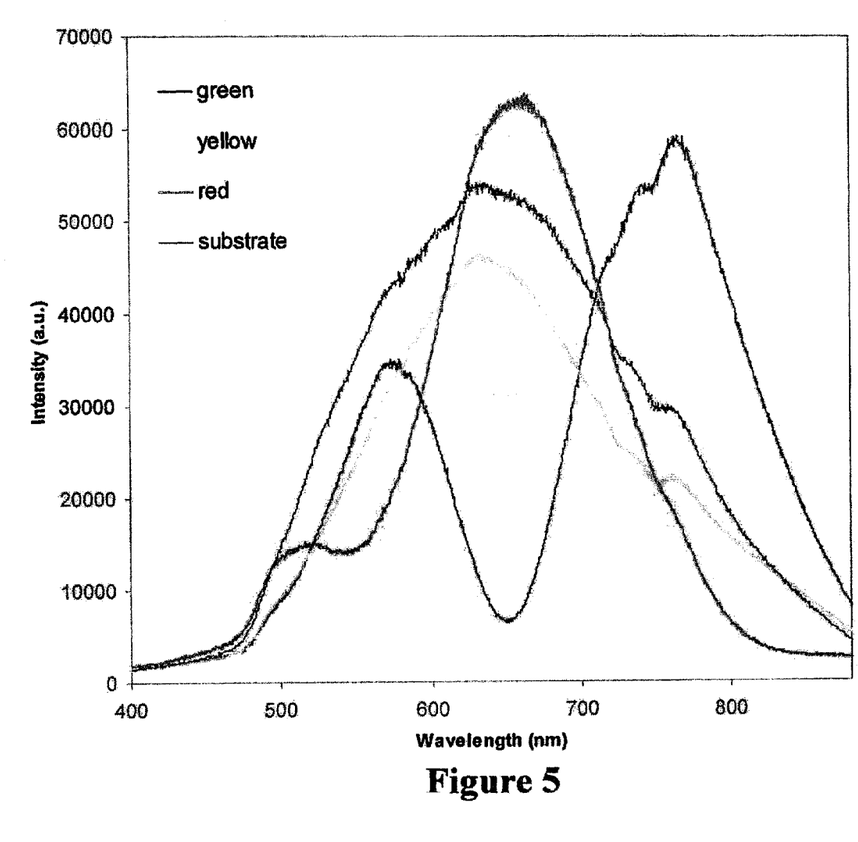
Figure 6:
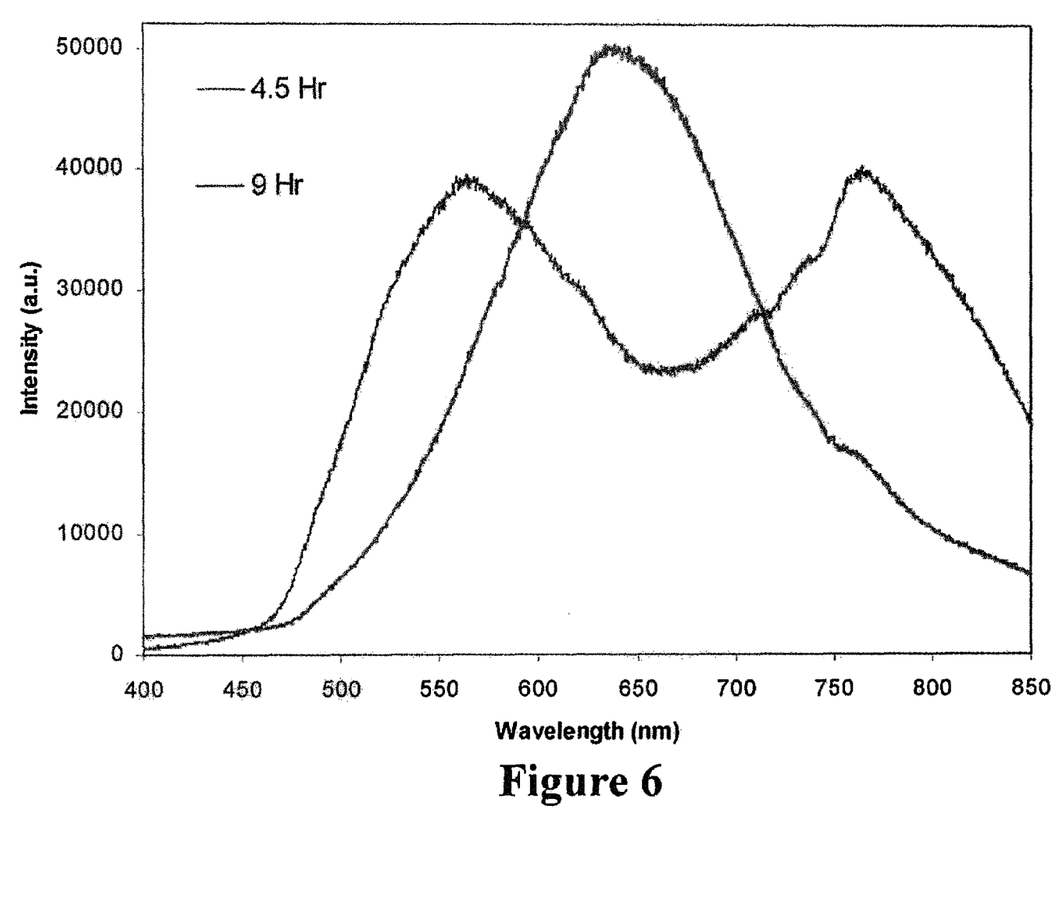
FIG. 6 graphically represents reflectance spectra of the Ni-based porous rugate filter structures fabricated with different with different heating time.

To further adjust the optical properties of the dielectric portions in the fabricated structures, the structure is heated to generate an oxide coating on the metal walls. Note that nickel oxide (NiO) is magnetic as well. The periodicity, foraminosity and the thickness of the coated oxide layer can be fine tuned by adjusting the electrodeposition, dealloying, and heating parameters, leading to adjustable optical features of the structure. FIGS. 5 and 6 demonstrate that by adjusting the heating time, or the layer thickness, the optical features or the color of the sample, can be fine tuned.

Figure 7:
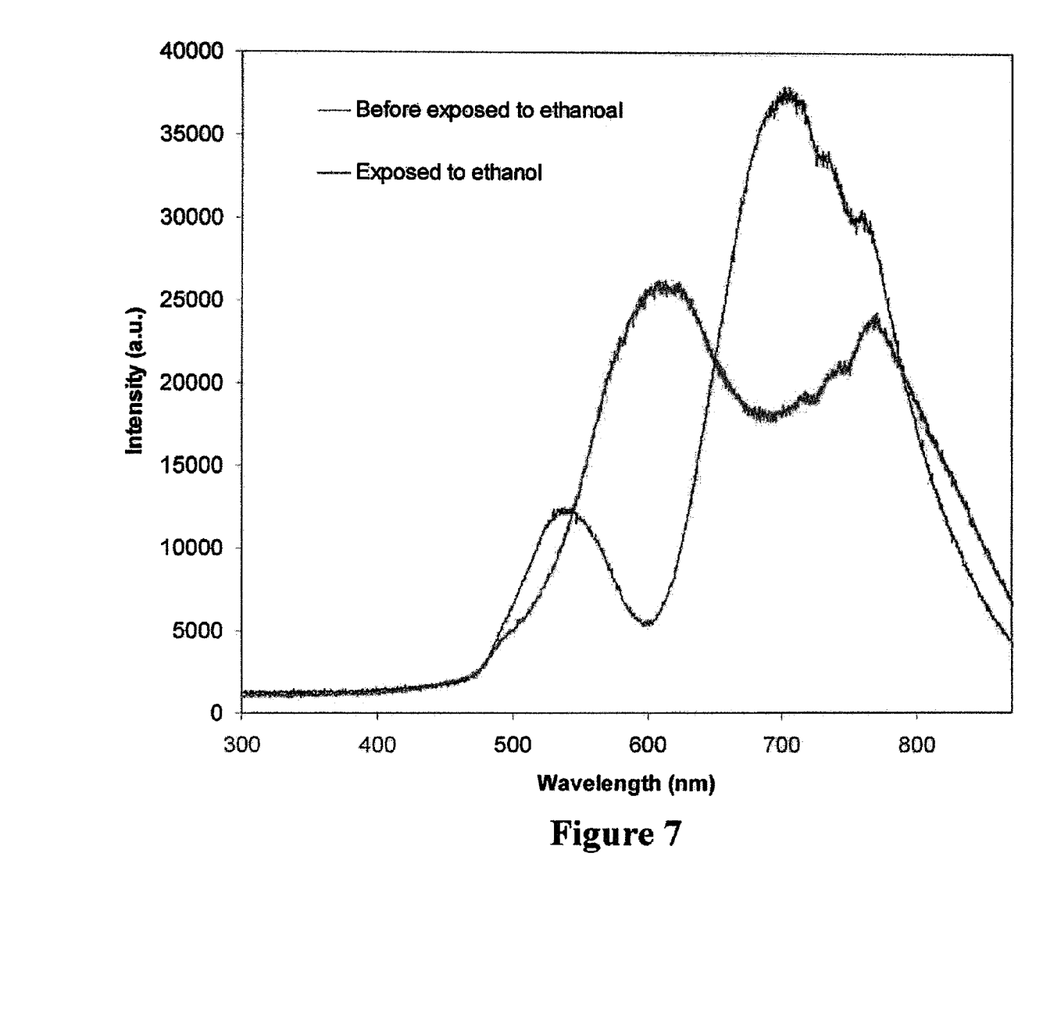
FIG. 7 graphically represents reflectance spectra of the Ni-based porous rugate filter structures before and after exposed to ethanol vapor.

Because the periodicity layers (tens of nm) is an order of magnitude smaller than the visible light wavelength in the free space the structure has subwavelength plasmonic properties. FIG. 7 demonstrates the potential sensing application of the fabricated rugate filter as the sample's color changes when exposed to ethanol vapor.

What is claimed is:

1. A method of making a porous microstructure, the method comprising:
preparing an electrodeposition solution containing ions of nickel and ions of copper;
immersing an electrically conducting substrate as a working electrode, and an electrically conducting metal wire in the electrodeposition solution as a counter electrode;
immersing a reference electrode in the electrodeposition solution;
applying a sine wave voltage having a period of 400 seconds and varying in magnitude between −0.885 volts and −0.850 volts, between the working electrode and the reference electrode, and depositing a multilayer film of nickel and copper on the substrate; and
after electrodepositing the multilayer film of nickel and copper on the substrate, removing copper from the multilayer film of nickel and copper in the electrodeposition solution by applying a voltage of 0.5 volts between the working electrode and the reference electrode to produce the porous microstructure including pores having sizes in a range from 50 nm to 200 nm, and a periodicity of about 50 nm along a thickness direction of the porous microstructure.

2. The method of claim 1 comprising, after removing copper from the multilayer film, heating the porous microstructure and producing surface oxidation on walls of the porous microstructure.

3. The method of claim 2, wherein preparing the electrodeposition solution includes dissolving nickel sulfamate in a concentration of 0.5 M and copper sulfate in a concentration of 0.05 M and adjusting the pH to 2.5.

4. The method of claim 3, wherein the working electrode is one of indium tin oxide on a glass support and gold-coated silicon.

5. The method of claim 3, wherein the counter electrode is a platinum wire.

6. The method of claim 3, wherein the reference electrode is a calomel electrode.

7. The method of claim 2, wherein the working electrode is one of indium tin oxide on a glass support and gold-coated silicon.

8. The method of claim 2, wherein the counter electrode is a platinum wire.

9. The method of claim 2, wherein the reference electrode is a calomel electrode.

10. The method of claim 1, wherein preparing the electrodeposition solution includes dissolving nickel sulfamate in a concentration of 0.5 M and copper sulfate in a concentration of 0.05 M and adjusting the pH to 2.5.

11. The method of claim 10, wherein the working electrode is one of indium tin oxide on a glass support and gold-coated silicon.

12. The method of claim 10, wherein the counter electrode is a platinum wire.

13. The method of claim 10, wherein the reference electrode is a calomel electrode.

14. The method of claim 1, wherein the working electrode is one of indium tin oxide on a glass support and gold-coated silicon.

15. The method of claim 1, wherein the counter electrode is a platinum wire.

16. The method of claim 1, wherein the reference electrode is a calomel electrode.

\* \* \* \* \*